United States Patent

Stuhr

[11] Patent Number: 5,182,498
[45] Date of Patent: Jan. 26, 1993

[54] SPRING RETURN ROTARY ACTUATOR

[75] Inventor: Leslie P. Stuhr, Corcoran, Minn.

[73] Assignee: Honeywell Inc., Minneapolis, Minn.

[21] Appl. No.: 800,171

[22] Filed: Nov. 27, 1991

[51] Int. Cl.$^5$ ............................................. F16K 31/04
[52] U.S. Cl. ..................................... 318/15; 318/40;
318/51; 318/160; 185/40 R; 251/129.11;
251/69
[58] Field of Search ...................... 318/8, 9, 14, 15, 46,
318/51, 53, 98, 99, 112, 159, 160, 40; 310/68 B;
74/431; 192/138, 139, 142 R; 251/129.01,
129.02, 129.11, 129.12, 69; 185/40 R

[56] References Cited

U.S. PATENT DOCUMENTS

| | | | |
|---|---|---|---|
| Re. 32,610 | 2/1988 | Washbourn et al. | 318/372 |
| 4,270,452 | 6/1981 | Gertsch et al. | 101/48 |
| 4,595,081 | 6/1986 | Parsons | 185/40 |
| 4,677,355 | 6/1987 | Baumann | 318/160 |
| 4,741,508 | 5/1988 | Fukamachi | 251/71 |
| 5,016,589 | 5/1991 | Terazawa | 123/399 |
| 5,085,401 | 2/1992 | Botting et al. | 251/129.11 |

Primary Examiner—Bentsu Ro
Attorney, Agent, or Firm—Edward Schwarz

[57] ABSTRACT

A rotary actuator uses a two degree of freedom gear train with three torque members to provide torque to the output element from a first torque member. The torque is supplied to a second torque member from a drive motor. A torsion spring on the third torque member is normally wound tight and held wound by a brake which locks the third torque member during normal operation when electrical power is available for the drive motor. When power is lost, the brake releases the third torque member, allowing the spring to apply torque to the third torque member to drive the output element through the first torque member to a return position. This allows loads such as valves to be returned to a safety condition upon loss of electrical power to the system of which the load and the actuator are a part.

11 Claims, 1 Drawing Sheet

SPRING RETURN ROTARY ACTUATOR

BACKGROUND OF THE INVENTION

A variety of mechanical devices are controlled by rotating an input element to a specified angular position. For example, in the heating and ventilating field, valves may be closed or opened by rotating the stem and dampers by adjusting their shutters, perhaps with a crank or eccentric. These devices are usually operated by a reversible electric actuator of some kind. A solenoid is a simple type of a linear actuator. When operating devices such as valves however, it is preferred to use a reversible rotary actuator because of the convenience of having a rotary actuator for a rotary load. Of course, by use of a rack and pinion or crank, rotary motion can be converted to linear motion and vice versa.

The internal construction of these rotary actuators is quite simple. A small reversible electric motor drives the output shaft through a reduction gear train. The ratio and internal friction of the gear train is usually such that the output shaft is locked against movement caused by back torque from the load. There is also some sort of adjustable stop or limit switch to define each end of the output shaft rotation.

In the course of long term system operation, there are many short and long term power outages. In certain circumstances, there are safety implications if the electric power for the control unit for the system of which an actuator forms a part should fail. For example, if a gas valve is open at the time power is lost, it is important that the valve be promptly closed to prevent accumulation of dangerous quantities of gas. There are many other reasons also why it is necessary or desirable to close or operate a device upon loss of electric power.

To answer these requirements, a class of actuators having a spring return feature have been developed. The idea is that when power is lost to the drive motor, the spring will generate sufficient torque on the output shaft to return its load to the safety position. In the simplest embodiments, the spring is wound and unwound as the motor drives the output shaft away from and toward the safety position during normal operation of the system. When power fails, a brake is released and the spring drives both motor and load to the safety position. This mean that the motor must be sized to overcome the spring torque during outward excursions of the output shaft. Since reversible electric motors typically provide the same torque regardless of the direction in which they are driving this means that the motor must have torque output substantially greater than that required merely to move the load.

BRIEF DESCRIPTION OF THE INVENTION

The electrically powered spring return rotary actuator of this invention decouples the spring winding function timewise from operation of the output shaft. That is, the spring is wound whenever power is first applied to the unit and then stays wound until power is lost to the unit. When power is lost, then the spring is activated and returns the output shaft to its safety position.

According to my invention, such an actuator comprises a frame on which the elements of this actuator are mounted. Typically the frame will comprise an enclosure within which the elements are carried. Torque is carried by a gear train having two degrees of freedom and mounted on the frame. The gear train is one of the type comprising at least first, second, and third mutually coupled gears mounted for rotation within the frame. The gear train further includes a drive element, a spring element, and an output element, each element mounted for rotation about an axis and to transfer torque to and from one of the first, second, and third gears.

A torsion spring is connected at a first end to the spring element and at the second end to the frame, the torsion spring of the type to be wound up by rotation of the spring element in a first direction, and when wound, applying torque to the spring element in a second direction. A spring element lock is mounted on the frame and connected to the spring element, and has a first state locking the spring element against rotation, and a second state allowing rotation of the spring element.

The drive motor for the actuator is mounted on the frame and has a shaft connected to apply torque to the drive element responsive to application of power to the drive motor. The drive motor locks the drive element against rotation responsive to absence of electrical power to the motor. Some types of AC drive motors have inherent cogging action which automatically provides this locking function. Others which do not have this feature may include an appropriate brake to lock the output element.

There is also an output element lock having a stop element mounted on the frame and a cog element connected to the output element. The output element lock has a first state wherein the cog and stop elements cooperate to lock the output element against rotation in at least a first direction, and a second state allowing rotation of the output element. The output element lock will typically arise as an inherent feature of the load connected to the output element. For example, if the actuator is controlling a valve, the lock is "activated" when the valve has been closed, preventing further rotation of the output element.

There are three distinct modes of operation of this actuator. When power is first applied to the actuator, the spring will typically be unwound, the spring element lock will be in its second state (unlocking the spring element), and the output element lock will be in its first state, locking the output element against rotation in the first direction. The power applied to the motor generates torque applied through the motor shaft, the drive element, and the gear train to the spring element to wind the torsion spring. Once the spring is wound, power is applied to the spring element lock to lock the spring element. This can be accomplished by a turn counter connected to the spring element.

The second mode of operation then arises, with torque applied by the motor to the drive element when the spring element lock is in its first state, being transferred by the gears to the output element. This is the normal mode of operating.

A third state of operation arises should power be lost to the actuator. This places the output element lock in its second state. Since power has been lost, the spring element lock releases. Since the torsion spring is wound, the torsion spring is then freed to apply torque to the output element through the spring element and the gears.

The presently preferred embodiment of this invention employs as the gear train a planetary gear system having a sun gear, a spider, at least one planet gear mounted for rotation on the spider and engaging the sun gear, and a ring gear engaging the planet gear. The sun gear is coupled to receive torque from the motor element, the spider is coupled to provide torque to the output element and the ring gear is coupled for torque transfer to and from the spring element.

Accordingly, one purpose of the invention is to avoid constant winding and unwinding a return spring of a rotary actuator.

Another purpose is to allow use of a relatively small motor for a desired output torque.

Other purposes of the invention will become apparent from the following descriptive materials.

BRIEF DESCRIPTION OF THE DRAWING

The FIG. 1 is a plan view illustrating the relationship among the elements of a preferred embodiment of the invention employing a planetary gear system.

DESCRIPTION OF THE PREFERRED EMBODIMENTS

Figure 1:
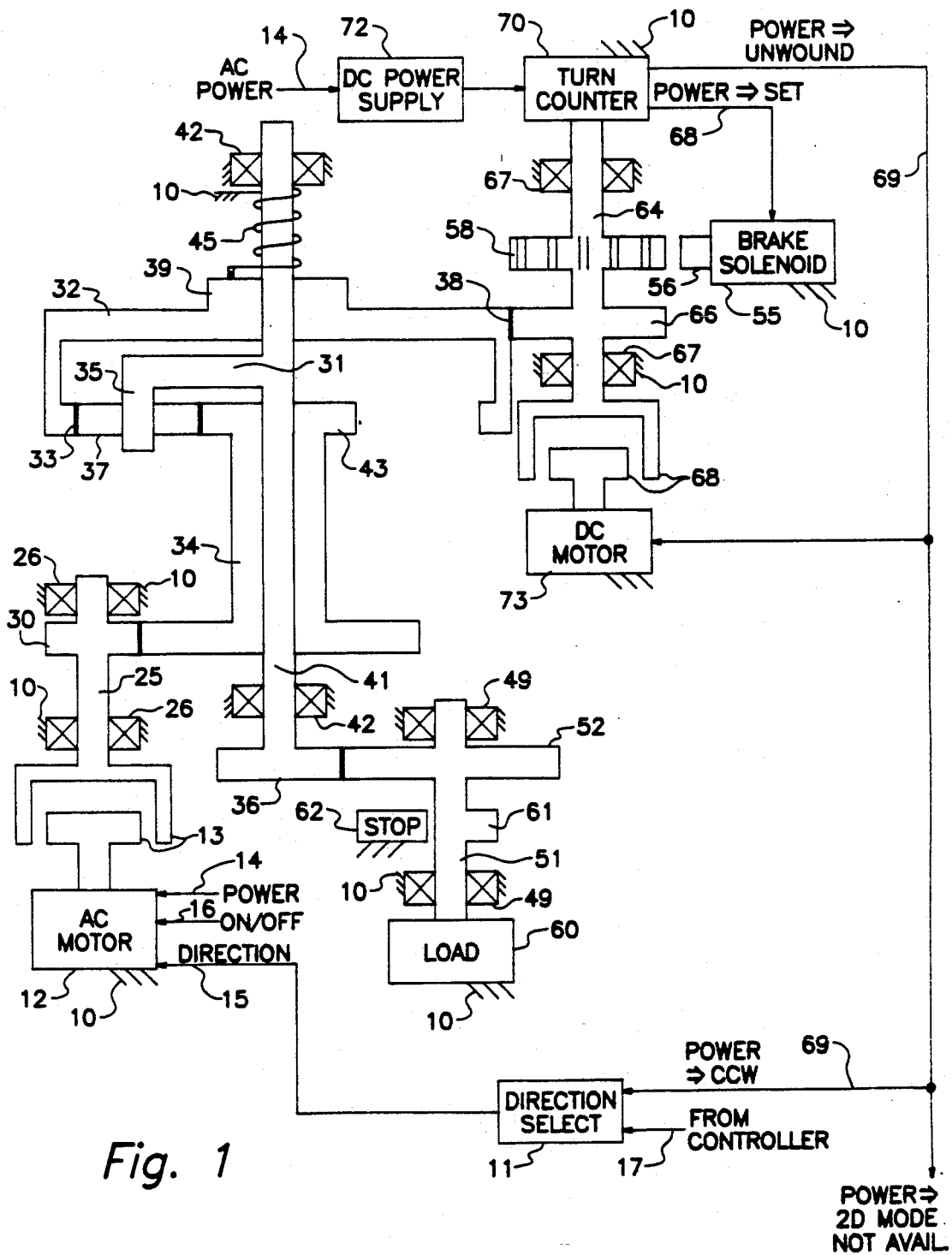

Turning to the FIGURE, it is helpful to first explain a number of the protocols employed in it. Individual gears are with one exception shown as horizontally elongated rectangles with a thick vertical line defining one or both narrow sides. The thick line represents a point of meshing of the particular gear's teeth with another gear. Each gear is assumed to rotate about a vertical axis in the paper. The exception mentioned to the depiction of gears as elongate rectangles is the ring gear 32 in the FIGURE which has interior teeth 33 and also includes a set of external gear teeth. Shafts are shown as vertically elongated rectangles. If the vertical lines representing a shaft pass through a particular gear unbroken, this indicates that the gear and shaft rotate independently. If the vertical shaft lines break at a gear, this implies that the gear is fixed on the shaft and both turn together. Rotation sense of shafts and gears will be determined as though viewed from the bottom of the FIGURE upwards, so that clockwise rotation of a gear or shaft will correspond to movement from left to right of the surface as presented to the viewer in the FIGURE. Bearings are represented by a pair of squares adjacent a shaft, each with an "X" within it. The bearings are of course assumed to resist both radial and axial loads so as to maintain both the relative radial and axial positions shown for the various gears. The frame or enclosure 10 within which the entire assembly is mounted, is symbolized by the three short, adjacent, diagonal lines shown in association with the reference number 10. Lastly, the symbol => is used to mean "causes" or "implies", thus POWER=>SET with reference to brake solenoid 55 means that the brake is set when power is present.

STRUCTURE

Turning first to the device shown in the FIGURE, torque for the normal operation of positioning the load 60 is provided by a reversible AC motor 12 having substantial cogging torque and mounted on frame 10. Electric power for operation is provided to motor 12 from a symbolically shown power source 14. Actual commands for starting and stopping rotation of the motor 12 shaft ar provided by an on/off signal on path 16, and direction of rotation is controlled by a direction signal provided on a path 15. A direction selector module 11 receives direction commands from the system controller on path 17 and also on path 69 which as indicated by the legend specifies counterclockwise rotation of the motor 12 shaft, overriding any command on path 17. The direction selector then provides the actual direction command to motor 12 on path 15.

The term "cogging torque" mentioned in the description of motor 12 means inherent strong resistance to rotation of the motor 12 shaft when power is not applied to it on path 14. It is also possible to use a motor without cogging torque in this application if a brake of some sort is attached to lock either the shaft of motor 12 or a shaft in direct coupling to motor 12 when power is removed from motor 12.

Because of the desire to accurately limit maximum torque output of the actuator, motor 12 provides torque to the gear trains through a torque limiting clutch 13, one of whose components is fixed to the shaft of motor 12 and the other is fixed to a power shaft 25. Shaft 25 is mounted for rotation in bearings 26, and bearings 26 are mounted on frame 10. Clutch 13 is preferably of the magnetic drag cup type which transmits a preselected amount of torque, and slips if torque demands should exceed this preselected level. It is also possible to use a mechanical slip clutch for clutch 13, but the potential for wear and change in the torque limit makes this choice less attractive. Accurate limitation of torque is desirable in those applications where the load is of the type which can be damaged by excessive torque.

A gear 30 fixed on shaft 25 meshes with and drives a gear 40 which serves as one input to a two degree of freedom gear train. The number of teeth on gear 30 will typically be much smaller than the number of teeth on gear 40, and indeed, it is likely that there should be several stages of speed reduction gearing from motor 12 to gear 40. These stages are not shown because such gearing is very common in these actuators, and including such gearing in the FIGURE might obscure the invention. Gear 40 is fixed to a main gear train shaft 41 which is mounted on frame 10 by bearings 42.

Gear 40 provides one of the torque inputs to a planetary gear system comprising a outer shaft 34 carried on the main shaft 41, a sun gear 43 carried on the outer shaft 34, a spider 31 fixed to main shaft 41 and carrying a spider shaft 35, a planet gear 37 carried on spider shaft 35, and a ring gear 32 having internal teeth 33. The planet gear 37 is mounted for rotation on spider shaft 35 and engages sun gear 43. Typically there will be provided three planet gears 37 carried o spider shafts mounted on the spider 34 at equal angular spacings to lessen load on the various bearings. The ring gear 32 has a hub 39 by which gear 32 is mounted for rotation on but not with, shaft 41, and by which the internal teeth of gear 32 are held in engagement with the planet gear or gears 37. Main shaft 41 has a takeoff gear 36 by which torque may be transferred to and from spider 31. Ring gear 32 also has an external set of gear teeth at 38 by which torque may be received. It is also possible to mount the spider 31 on the outer shaft 34 and the sun gear 43 on the main shaft 41. The arrangement shown in the FIGURE is believed to be the most desirable because the low torque, high speed input to gear 40 from motor 12 is carried by the relatively lightly loaded bearings of outer shaft 43 rotating on main shaft 41 rather than by the bearings 42 which carry the heavy loading arising from the high torque of shaft 41.

A torsion spring 45 is attached to the hub 39 of ring gear 32 at one end and to the frame 10 at the other. Hub 39 forms a spring element for transferring torque between ring gear 32 and torsion spring 45. For simplicity, spring 45 is shown as a simple coil but in practice will comprise a powerful clock spring made of flat spring stock capable of at least tens of turns and having winding torque in excess of a value which can be applied by motor 12 as limited by clutch 13 to shaft 41 through the reduction gear train represented by gears 30 and 40 and the planetary gear system with stop 62 holding spider 31 against rotation through reduction gear 36 and load gear 52. The assumption is that spring 45 winds with rotation of gear 32 in the counterclockwise (right to left) direction and unwinds with clockwise rotation of gear 32.

Torque to operate a load 60 is provided by the reduction gear 36 on main shaft 41 which drives load gear 52 carried on the shaft 51 of load 60. Since load 60 typically requires relatively high torque and need be driven only through a few rotations at most and typically only a fraction of one rotation, a greater speed reduction from outer shaft 34 to load 60 than that suggested by the FIGURE will be required. Load 60 includes a stop assembly comprising a tab or cog 61 carried on the load shaft 51 and a stop 62 carried on frame 10. When shaft 51 has rotated in a preselected direction, counterclockwise in this embodiment, to a return or safety position, tab or cog 61 and stop 62 cooperatively prevent further rotation of shaft 51.

It was explained above that in this preferred embodiment motor 12 and clutch 13 are deliberately selected to provide insufficient torque to wind spring 45 with the spider 34 locked. The reason for this is to equalize the torque applied to load 10 whether being driven by motor 12 or by spring 45. It is of course possible to use variable gearing (i.e., a transmission) to increase the torque applied by motor 12 and clutch 13 to gear 40 when winding spring 45. However, it is much cheaper to use a second motor 73 as the source of the additional torque needed for winding spring 45. Accordingly, this additional torque is provided through a second torque limiting clutch 68 by a spring winding helper DC motor 73 mounted on frame 10. Motor 73, whose shaft rotates clockwise, provides torque as reflected through its gear train, that is approximately equal to the preload on spring 45 and the friction between adjacent turns which arises during winding. Clutch 68 is preferably also of the magnetic drag cup type with one element carried on the shaft of motor 73 and another element carried on an idler shaft 64 rotating in bearings 67. Motor 73 and clutch 68 are thus also selected to by themselves provide insufficient torque through their gearing to wind spring 45. A gear 66 is mounted on idler shaft 64 and transmits torque from motor 73 to a set of gear teeth 38 on the outer surface of ring gear 32. DC power is applied on path 69 to motor 73 when appropriate. It is characteristic of springs such as spring 45 that more torque is required to wind the spring than is furnished when it unwinds. By the use of two motors for winding spring 45, the output torque of spring 45 can be held reasonably close to the output torque of motor 12 through clutch 13. In this way, the possibility of load 60 receiving excess torque is avoided. Motor 73 spins at high speed during a spring winding phase of operation, and clutch 68 transmits its designed torque level to shaft 64 for multiplication by the gear train of gears 66 and the external teeth of gear 32. It was found that it was undesirable to use a second AC motor to serve as the helper motor for winding spring 45 because of the additional cost and size of AC motors.

Winder shaft 64 also carries a toothed wheel 58 forming a part of a brake assembly. This brake assembly includes a brake solenoid 55 mounted on frame 10 which responds to DC electric power on path 68 to moves a pawl 56 into engagement with a tooth of wheel 58 to thereby lock shaft 64 and ring gear 32. If DC power is not present on path 68, then an internal spring retracts pawl 56 out of engagement with the teeth of wheel 58. The notation POWER=>SET adjacent path 68 symbolizes this functionality. The DC power on path 68 to operate brake solenoid 55 is provided by a DC power supply 72 which receives its AC power on path 14 from the power source 14. Power for the brake solenoid 55 is controlled by a brake switch operated by a turn counter 70 connected to winder shaft 64 and carried on frame 10. If ring gear 32 has not rotated the number of turns needed to fully wind spring 45, then this brake switch in turn counter 70 is open and power is not conducted from DC power supply 72 to conductor 68. When ring gear 32 has rotated to a position which has fully wound spring 45, then the winder switch in turn counter 70 closes applying power to brake solenoid 55.

There is also a motor switch within turn counter 70 which controls flow of power to DC motor 73 from DC power supply 72. When turn counter 70 senses that spring 45 is not wound, then the motor switch within turn counter 70 is closed allowing current from power supply 72 to flow on path 69 to motor 73. The voltage on path 69 also forms an input to direction selector 11, overriding any direction commands from the controller as mentioned earlier.

OPERATION

There was earlier mention made of three different modes of operation for this apparatus. In the first mode, spring 45 is unwound. In this state, power is applied on path 14 and both motors 12 and 73 receive power. The power applied on lines 14 to motor 12 along with the interpretation of the voltage on path 69 by direction selector 11 causes counterclockwise rotation of the motor 12 shaft during this mode of operation. Motor 73 receives power because turn counter 7 has closed its internal motor switch because of the unwound state of spring 45. Power is not applied to path 68 because spring 45 is not fully wound, the state in which solenoid 55 withdraws pawl 56 from wheel 58, freeing shaft 64 and allowing DC motor 73 to apply clockwise torque through clutch 68 and gears 66 and 32 to spring 45. At the same time, AC motor 12 applies torque to ring gear 32 and spring 45 through the reduction gear train and the planetary gear system. The torque produced by the two motors 12 and 73 additively produce counterclockwise torque on gear 32 sufficient to cause winding of spring 45. It can be seen that the torque generated by counterclockwise rotation of motor 12 applies clockwise torque through spider 31 to shaft 41, which is reversed by gears 36 and 52 to produce counterclockwise torque on shaft 51 of load 60. If shaft 51 is not locked against counterclockwise rotation by the stop assembly of tab 61 and stop 62, then the combined torque of the two motors is applied to drive shaft 51 to its locked position. Once shaft 51 position has been frozen, torque of motors 12 and 73 is directly applied to ring gear 32 to wind spring 45.

For each complete counterclockwise turn of spring 45, shaft 64 rotates a specific number of turns which is directly dependent on the gear ratio of gears 32 and 64. When gear 32 has been turned the amount necessary to fully wind spring 45, then both the internal switches within turn counter 70 change state, applying power to path 68 to operate solenoid 55 and cause it to lock wheel 58, and removing power from motor 73 to stop its operation. Absence of power on path 69 may also be used as a signal to the controller indicating that operation in the second mode is possible.

The second mode of operation is the normal mode. When the brake assembly has locked wheel 58 and ring gear 32, then motor 12 can drive shaft 51 to any position specified by the signals carried on paths 15 and 16 while power is applied on path 14 to motor 12. In this situation, rotation of outer shaft 34 and sun gear 43 drive spider 31 and main shaft 41 through planet gear 37. Rotation of gear 36 on shaft 41 then drives the load through gear 52. The torque limit inherent in clutch 13 protects load 60 against overload.

Should power be lost, solenoid 55 releases pawl 56 from wheel 58. This frees ring gear 41 allowing spring 45 to drive ring gear 32 clockwise in the third mode of operation. The cogging torque of motor 12 freezes shaft 34 while power is lost. Clockwise rotation of ring gear 32 drives inner shaft 41 in a clockwise direction through planet gear 37, which ultimately drives the load shaft 51 counterclockwise until cog 61 contacts stop 62 and locks shaft 51 against further counterclockwise rotation. In this way, loss of power to the actuator allows energy stored in spring 45 to return load 60 to a safe position. Once power is restored then the actuator enters its first operating mode as controlled by turn counter 70 in which spring 45 is wound, and then once the first operating mode has been completed, the second, normal mode.

While the design in the FIGURE uses a planetary gear system to couple the three sources or receivers of torque, any two degree of freedom gear train may be used as well. In particular, a differential gearing system may be used to advantage in place of the planetary gear system in certain situation. In the specific application for which this invention was developed, it was convenient to have parallel axes for the rotating elements of the gear train, something not possible with a differential gear train.

Applicant also wishes to note that details of the arrangement of planetary gear train can be varied without affecting the operation of the actuator. In particular, applicant wishes to note that the commercial embodiment shown in the FIGURE which has the internal or main shaft 41 carrying the spider 31 and planet gear 37, and the outer shaft 34 carrying the sun gear 43 can be reversed. By this is meant that the spider 31 can also be mounted on outer shaft 34 and the sun gear 43 can be mounted on inner shaft 41. As mentioned above, this design places the high load of the output torque to gear 52 on the same bearings which carry the relatively low input torque from motor 12. This extra loading increases bearing friction and will require more motor torque for similar output. However, there may be other advantages in certain applications which will compensate for this mechanical inefficiency.

What is to be protected by letters patent is:

1. An electrically powered spring return rotary actuator, comprising:
    a) a frame;
    b) a gear train comprising at least first, second, and third mutually coupled gears mounted for rotation within the frame and further including a drive element, a spring element, and an output element, each element mounted for rotation about an axis and to transfer torque to and from one of the first, second, and third gears;
    c) a torsion spring coupled at a first end to the spring element and at a second end to the frame, the torsion spring of the type to be wound up by rotation of the spring element in a first direction, and when wound, applying torque to the spring element in a second direction;
    d) a spring element lock which is mounted on the frame and connected to the spring element, and having a first state locking the spring element against rotation, and a second state allowing rotation of the spring element;
    e) a drive motor mounted on the frame and having a shaft connected to apply torque to the drive element responsive to application of power and locking the drive element responsive to absence of power; and
    f) an output element lock having a stop element mounted on the frame and a cog element connected to the output element, and having a first state wherein the cog and stop elements cooperate to lock the output element against rotation in at least a first direction, and a second state allowing rotation of the output element; wherein,
    when the spring element lock is in its second state and the output element lock is in its first state, motor torque is applied through the motor shaft, the drive element, and the gear train to the spring element to wind the torsion spring; torque applied by the motor to the drive element when the spring element lock is in its first state applies torque through the gears to the output element; and when the output element lock is in its second state, power is absent, and the torsion spring is wound, the torsion spring applies torque to the output element through the spring element and the gears.

2. The actuator of claim 1, wherein the gear train comprises a planetary gear system whose components include
    a) a sun gear coupled to receive torque from the drive element;
    b) a spider coupled to provide torque to the output element;
    c) at least one planet gear mounted for rotation on the spider and engaging the sun gear; and
    d) a ring gear engaging the planet gear and coupled for torque transfer to and from the spring element.

3. The actuator of claim 2, including a slip clutch connecting the drive motor to the drive element.

4. The actuator of claim 3, wherein the slip clutch comprises a torque limiting magnetic drag cup coupling.

5. The actuator of claim 2, wherein the spring element lock comprises an electrically operated brake mechanically connected to the spring element and receiving electric power with the drive motor, said brake responsive to absence of electric power releasing the spring element for rotation and responsive to application of electric power locking the spring element.

6. The actuator of claim 5, wherein the electrically operated brake comprises a solenoid-operated pawl mounted on the frame and a toothed wheel driven by the spring element, said solenoid connected to receive power with the drive motor, and said brake's pawl engaging the wheel responsive to electric power and disengaging from the wheel upon loss of electric power to the drive motor.

7. The actuator of claim 5 adapted for driving a load having a locked return position, and including a spring winding motor mounted on the frame and connected to drive the spring element, and wherein the drive motor is an AC electric motor having substantial cogging torque when unpowered, and the combined torque of the drive and the spring winding motors is sufficient to wind the torsion spring, the torque of either of the drive and spring winding motors being insufficient to wind the torsion spring.

8. The actuator of claim 7, wherein the spring winding motor is a DC electric motor further including a slip clutch connecting the spring winding motor to the spring element.

9. The actuator of claim 7, wherein the torsion spring can have wound and not wound states, said actuator further including a turn counter in mechanical connection with the spring element, said turn counter including a motor switch receiving electric power for the spring winding motor, and supplying electric power to the spring winding motor responsive to the not wound spring state.

10. The actuator of claim 9, wherein the turn counter includes a brake switch receiving electric power for the brake, and supplying the electric power to the brake responsive to the wound spring state.

11. The actuator of claim 2, wherein the planetary gear system includes an inner shaft to which the spider is fixed and an outer shaft to which the sun gear is fixed.

* * * * *